(No Model.)

J. H. WIESTNER.
SPLIT HOOF CLAMP FOR HORSES.

No. 381,868. Patented Apr. 24, 1888.

Witnesses.
David S. Williams.
William D. Conner.

Inventor.
John H. Wiestner.

By his Attorneys
Howson and Sons.

United States Patent Office.

JOHN H. WIESTNER, OF PHILADELPHIA, PENNSYLVANIA.

SPLIT-HOOF CLAMP FOR HORSES.

SPECIFICATION forming part of Letters Patent No. 381,868, dated April 24, 1888.

Application filed May 31, 1887. Serial No. 239,916. (No model.)

*To all whom it may concern:*

Be it known that I, JOHN H. WIESTNER, a citizen of the United States, and a resident of Philadelphia, Pennsylvania, have invented certain Improvements in Hoof-Clamps, of which the following is a specification.

The object of my invention is to provide simple and efficient means for the cure of split hoofs in horses and cattle; and this object I attain in the manner hereinafter set forth, reference being had to the accompanying drawings, in which—

Figure 1:
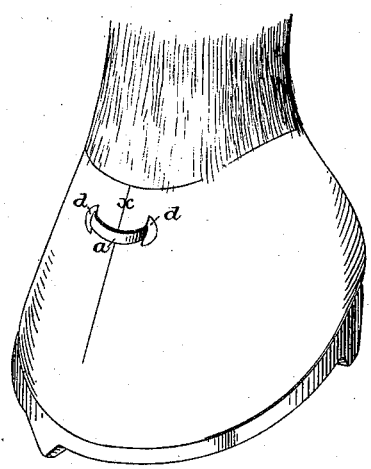
Figure 2:
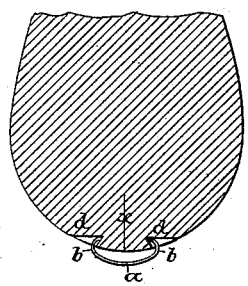
Figure 3:
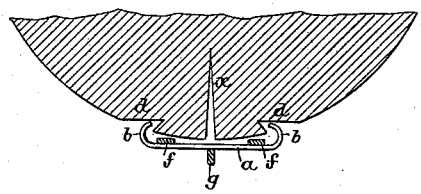
Figure 4:
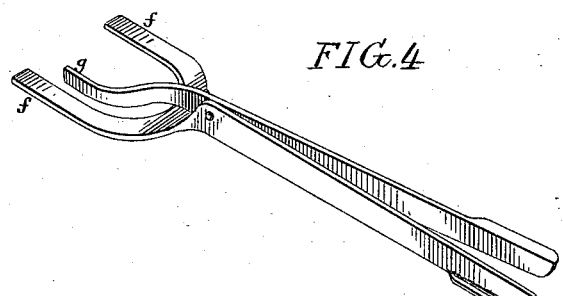

Figure 1 is a view of a horse's hoof, showing my improved device for closing the split in the same. Fig. 2 is a sectional plan view. Fig. 3 is an enlarged sectional view illustrating the mode of applying the device, and Fig. 4 a perspective view of a pair of tongs used in applying the device to the hoof.

So far as I am aware the only device adopted prior to my invention for closing splits in the hoofs of horses and cattle has been a pair of hooked bars drawn together by means of an interposed wedge or key, the hooks engaging with recesses in the hoof on opposite sides of the split. The objection to this device is its rigidity, which interferes with the natural shrinkage and expansion of the hoof, for if the clamp is keyed up as tightly as possible when the hoof is in the shrunken condition it will bind upon the hoof when the latter has a tendency to expand, while, on the other hand, if the clamp is applied to the hoof when the latter is expanded it will on the shrinkage of the hoof become loose and liable to drop off or necessitate continual attention for the purpose of tightening the key.

By "shrinkage" and "expansion" I mean that natural change in the condition of the hoof due to atmospheric or other influences, and independent of the drawing together of the front portion of the hoof to close the split.

In order to overcome the objection to the rigid clamp, I use a simple elastic clip consisting of a spring-bar, $a$, more or less bowed and provided at each end with a hook, $b$, the hooks being adapted to recesses $d$, formed in the front of the hoof on opposite sides of the split $x$ therein, the tendency of this spring-clip being to close the split and keep it closed, so as to prevent the entrance of dirt and afford an opportunity for the parts to grow together, the elasticity of the clip being such that it offers no material obstacle to the free expansion of the hoof and will follow up any shrinkage in the hoof, so as to keep the split in the same closed under all circumstances.

In order to prevent the clip from being detached, the recesses $d$, formed in the hoof, are beveled or undercut, as shown in Figs. 2 and 3, and the hooks at the ends of the clip are bent inward for adaptation to these undercut recesses; hence in order to apply the clip to the hoof it is necessary to expand the same in order to permit the hooks to enter the recesses. This I effect by means of a pair of tongs, (shown in Fig. 3,) one bar of the tongs having two projecting prongs, $ff$, and the other bar having a central prong, $g$. When the clip is clamped by this pair of tongs in the manner shown in Fig. 3, the central prong being upon the outer side of the clip, pressure upon said central prong tends to expand the clip by straightening the bowed portion of the same, so that the hooked ends of the clip can be readily slipped into the recesses $d$ in the hoof, the clip resuming its bowed form and drawing the hooked ends of the same into the recesses as soon as the pressure of the prong $g$ is removed therefrom.

I claim as my invention—

The within-described hoof-clamp, consisting of a bowed spring having its ends bent to form clips for engaging with the hoof, said spring possessing such inherent elasticity as to draw the bent ends toward each other, all substantially as specified.

In testimony whereof I have signed my name to this specification in the presence of two subscribing witnesses.

JOHN H. WIESTNER.

Witnesses:
WILLIAM D. CONNER,
HARRY SMITH.